United States Patent [19]

McCombie

[11] Patent Number: 5,574,217
[45] Date of Patent: Nov. 12, 1996

[54] ENGINE MISFIRE DETECTION WITH COMPENSATION FOR NORMAL ACCELERATION OF CRANKSHAFT

[75] Inventor: Jay C. McCombie, Rochester Hills, Mich.

[73] Assignee: Chrysler Corporation, Auburn Hills, Mich.

[21] Appl. No.: 468,117

[22] Filed: Jun. 6, 1995

[51] Int. Cl.$^6$ ............................................. G01M 15/00
[52] U.S. Cl. ................ 73/116; 364/431.07; 364/431.08; 123/419; 73/117.3
[58] Field of Search ................................. 73/116, 117.2, 73/117.3; 364/431.07, 431.08; 123/419, 436

[56] References Cited

U.S. PATENT DOCUMENTS

| | | | |
|---|---|---|---|
| 3,908,366 | 9/1975 | Masaki | 60/277 |
| 4,179,922 | 12/1979 | Bouverie et al. | 73/116 |
| 4,186,701 | 2/1980 | Suzuki et al. | 123/119 A |
| 4,271,811 | 6/1981 | Suzuki et al. | 123/571 |
| 4,308,519 | 12/1981 | Garcea et al. | 77/8 |
| 4,461,257 | 7/1984 | Hosaka et al. | 123/419 |
| 4,488,525 | 12/1984 | Morikawa | 123/425 |
| 4,491,110 | 1/1985 | Bone et al. | 123/425 |
| 4,532,592 | 7/1985 | Citron et al. | 364/431.05 |
| 4,562,818 | 1/1986 | Kohama et al. | 123/478 |
| 4,606,224 | 8/1986 | Tedeschi et al. | 73/117.3 |
| 4,716,874 | 1/1988 | Hilliard et al. | 123/425 |
| 4,782,692 | 11/1988 | Peden et al. | 73/117.3 |
| 4,846,129 | 7/1989 | Noble | 123/425 |
| 4,862,093 | 8/1989 | Jiewertz | 324/464 |
| 4,886,029 | 12/1989 | Lill et al. | 123/479 |
| 4,928,228 | 5/1990 | Fujimoto et al. | 364/431.09 |
| 4,930,479 | 6/1990 | Osawa et al. | 123/436 |
| 4,930,481 | 6/1990 | Fujimoto et al. | 123/481 |
| 4,932,379 | 6/1990 | Tang et al. | 123/436 |
| 4,936,277 | 6/1990 | Deutsch et al. | 123/436 |
| 4,941,445 | 7/1990 | Deutsch | 123/414 |
| 4,976,241 | 12/1990 | Ishida et al. | 123/425 |
| 4,987,711 | 1/1991 | Noji et al. | 52/167 DF |
| 4,987,771 | 1/1991 | Iwata | 73/117.3 |
| 5,021,960 | 6/1991 | Manaka et al. | 364/431.01 |
| 5,041,980 | 8/1991 | Maddock et al. | 73/116 |
| 5,044,194 | 9/1991 | James et al. | 73/112 |
| 5,044,195 | 9/1991 | James et al. | 73/117.3 |
| 5,056,360 | 10/1991 | Dosdall et al. | 73/116 |
| 5,095,742 | 3/1992 | James et al. | 73/116 |
| 5,109,695 | 5/1992 | James et al. | 73/117.3 |
| 5,117,681 | 6/1992 | Dosdall et al. | 73/116 |
| 5,144,927 | 9/1992 | Denz | 123/425 |
| 5,231,869 | 8/1993 | Klenk et al. | 73/116 |
| 5,307,671 | 5/1994 | Akase | 73/117.3 |
| 5,361,629 | 11/1994 | McCombie | 73/117.3 |
| 5,390,537 | 2/1995 | Kuroda et al. | 73/117.3 |
| 5,392,641 | 2/1995 | McCombie | 73/117.3 |
| 5,440,922 | 8/1995 | Ichikawa | 73/117.3 |
| 5,471,869 | 12/1995 | Kuroda et al. | 73/117.3 |

*Primary Examiner*—Richard Chilcot
*Assistant Examiner*—George M. Dombroske
*Attorney, Agent, or Firm*—Mark P. Calcaterra

[57] ABSTRACT

An apparatus and method are provided for detecting cylinder misfires in an internal combustion engine of a motor vehicle which is capable of detecting multiple cylinder misfires and more particularly opposed cylinder misfires. Crankshaft rotation is sensed and crankshaft velocities are measured for each cylinder. Changes in angular velocity are determined and correspond to each of a plurality of cylinder firing events. Angular velocity changes are sorted over a predetermined series of cylinder firings and the two middle most angular velocity changes are averaged to provide an average change in velocity value. A deviation is determined between the change in angular velocity for a selected cylinder and the average change in velocity value. The deviation is compared to a threshold value and a misfire event is determined for the selected cylinder based on the comparison.

8 Claims, 5 Drawing Sheets

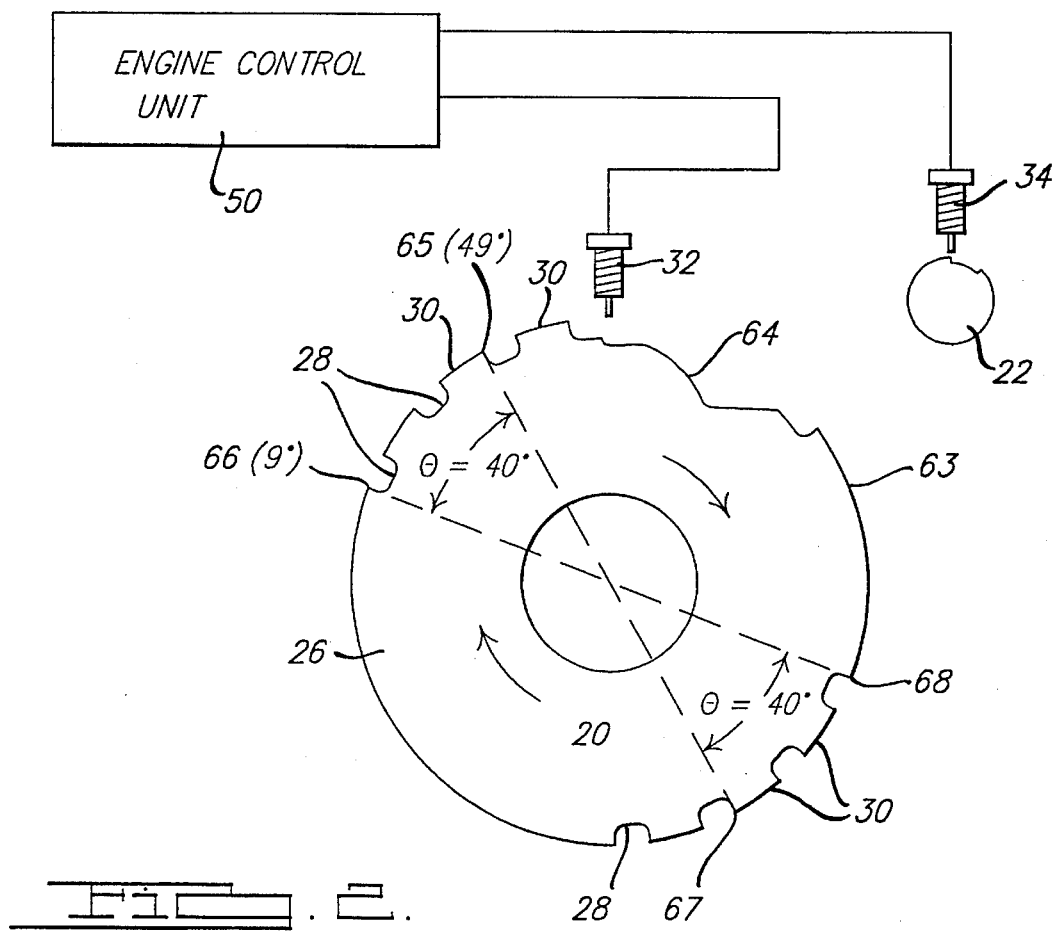
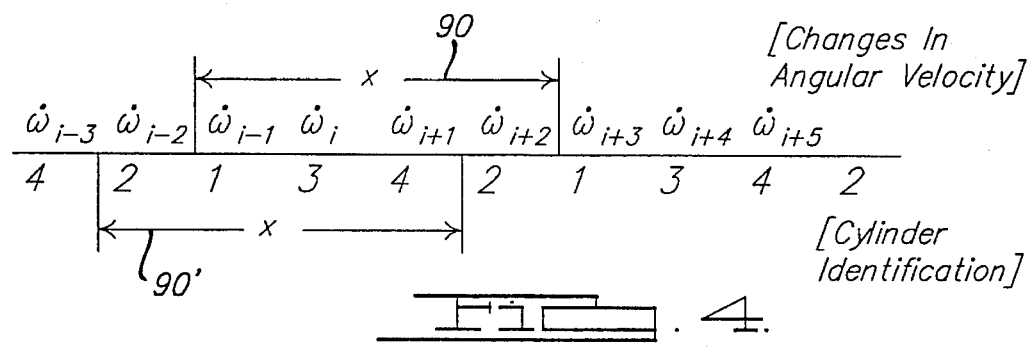
FIG. 4.
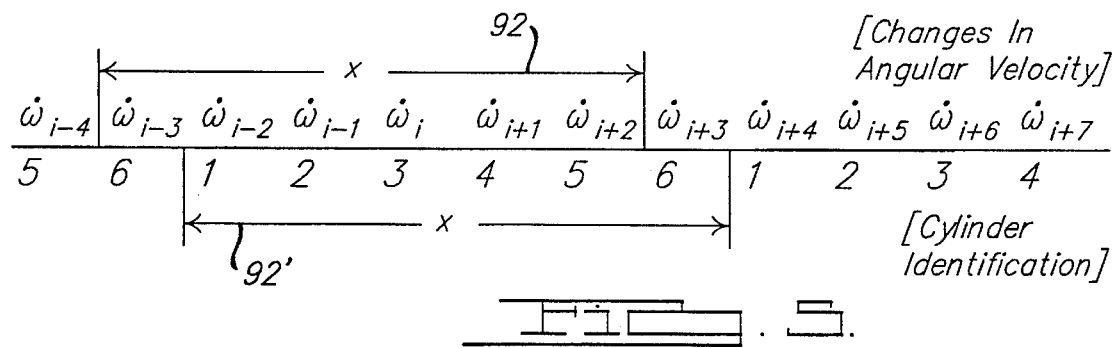
FIG. 5.

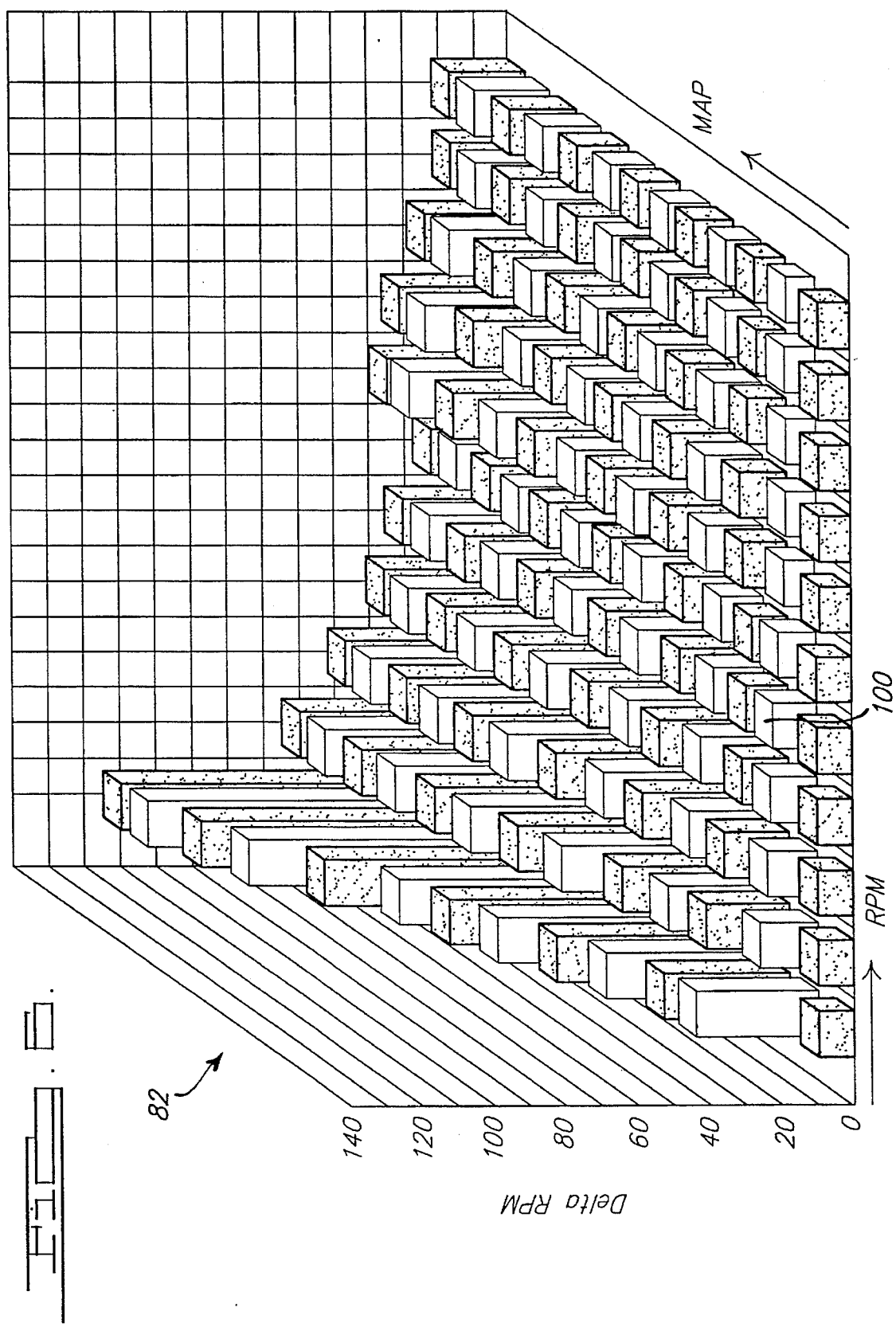

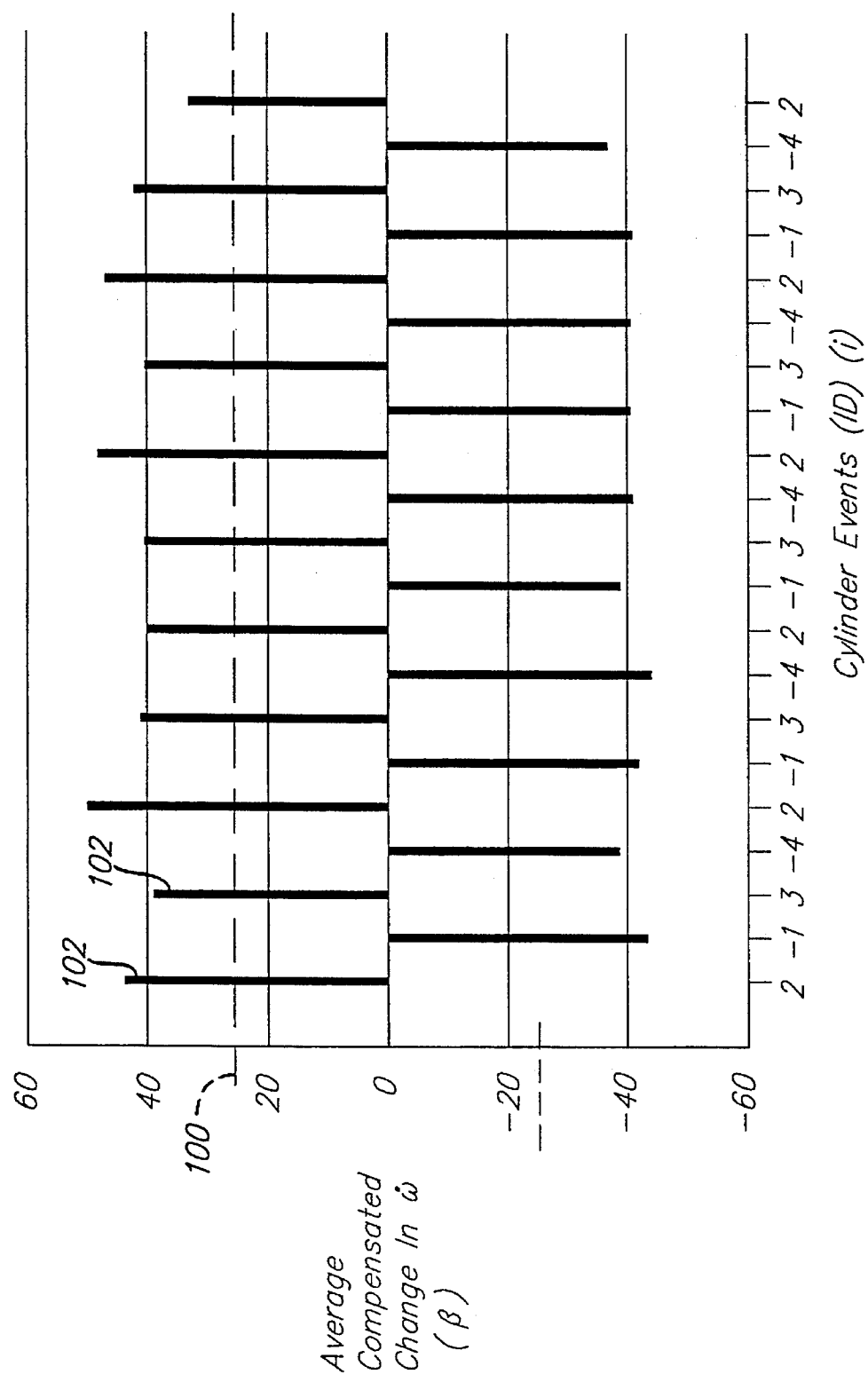

ENGINE MISFIRE DETECTION WITH COMPENSATION FOR NORMAL ACCELERATION OF CRANKSHAFT

CROSS-REFERENCE TO RELATED APPLICATIONS

This application relates to the following simultaneously filed patent applications titled "Engine Misfire Detection with Rough Road Inhibit" having Ser. No. 469,040 and application titled "Engine Misfire Detection with Cascade Filter Configuration" having Ser. No. 468,113. These related applications are hereby incorporated by reference.

BACKGROUND OF THE INVENTION

1. Technical Field

The present invention relates generally to internal combustion engines and, more particularly, to a misfire detection apparatus and method for detecting misfire of individual cylinders in an internal combustion engine.

2. Discussion

The Clean Air Act (1955) required motor vehicle manufacturers to reduce exhaust emissions of carbon monoxide, hydrocarbons, and oxides of nitrogen from light duty motor vehicles. To comply with the Act, most motor vehicle manufacturers generally use catalytic converters on production vehicles to control such exhaust emissions. A catalytic converter typically includes a catalyst and operates at a very high temperature in order to burn unwanted byproducts of combustion so as to reduce hydrocarbons, carbon monoxide and nitrous oxide. However, increased amounts of unburned byproducts that often remain after the occurrence of an engine misfire can lead to damage of the catalytic converter.

More recently, regulatory agencies have proposed that passenger, light-duty and medium-duty motor vehicles with feedback fuel control systems be equipped with a malfunction indicator function that will inform the motor vehicle operator of any malfunction of an emission-related component that interfaces with an on-board computer of the motor vehicle. It is also proposed or required that an on-board diagnostic system identify the likely area of malfunction. Proposals or requirements have set forth catalyst, misfire, evaporative purge system, secondary air system, air conditioning system refrigerant, fuel system, oxygen sensor, exhaust gas recirculation, and comprehensive component monitoring requirements.

As previously mentioned, misfire of internal combustion engines can cause damage to the catalyst of a catalytic converter. With respect to misfire, the identification of the specific cylinder experiencing misfire may be required. Some regulations provide that the motor vehicle manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a durability demonstration motor vehicle to fail a Federal Test Procedure (FTP) by more than 150% of the applicable standard if the degree of misfire were present from the beginning of the test; and (3) the degree of misfire evaluated in a certain number of revolution increments which would cause a durability demonstration motor vehicle to fail an inspection and maintenance (IM) program tailpipe exhaust emission test.

Current and proposed future regulations are also requiring that motor vehicle manufacturers be able to provide information detailing the occurrence of misfires such as identifying which cylinders are responsible for one or more misfires. The misfire information need be collected and stored in memory so that the stored information may be downloaded at a service center and used to determine the cause of misfires in the vehicle. One misfire detection and identification approach is disclosed in issued U.S. Pat. No. 5,361,629 issued Nov. 8, 1994 and titled "Single Sensor Misfire Detection Apparatus and Method for an Internal Combustion Engine". The above-cited patent is also hereby incorporated by reference. The misfire detection approach in the above-cited patent senses rotation of a crankshaft and calculates a crankshaft velocity based on the sensed rotation. The calculated crankshaft velocity changes or a compensated velocity change is compared to a predetermined crankshaft velocity range to determine if misfire occurred.

The above misfire detection approach compares crankshaft velocity change which does not compensate for normal engine acceleration. Furthermore, while a number of conventional approaches are capable of detecting a single misfire for a single cylinder, with misfires on cylinders which share a common coil and have a power stroke separated by 360° may go undetected. Opposed cylinder fire detection is especially desirable for a distributorless ignition system (DIS) where cylinders are commonly paired on the same coil. For instance, in a DIS with a four-cylinder engine, the firing interval may follow the order of cylinders 1 3 4 2, where cylinders 1 and 4 share the same coil and cylinders 2 and 3 share another coil. The commonly shared cylinders are separated by 360° of crankshaft rotation. If one of cylinders 1 or 4 is disconnected, a common mode failure may occur. This occurrence may result when a spark plug wire is disconnected for cylinder 1, which thereby results in dual cylinder misfires for cylinders 1 and 4. Detection of misfires for both cylinders is desired to help determine the cause of the misfire event.

It is therefore one object of the present invention to provide for an improved apparatus and method of detecting cylinder misfires in an internal combustion engine.

It is another object of the present invention to provide for a misfire detection apparatus and method which is capable of detecting opposed cylinder misfires for an internal combustion engine and which is capable of identifying which cylinders are responsible for the misfires.

It is yet another object of the present invention to provide for a misfire detection apparatus and method which compensates for normal engine accelerations, realizes a good signal to noise ratio and is capable of detecting multiple cylinder misfire events.

SUMMARY OF THE INVENTION

To achieve the foregoing objectives, the present invention is an apparatus and method for detecting misfire in individual cylinders of an internal combustion engine of a motor vehicle. The apparatus and method of the present invention are advantageously capable of detecting multiple cylinder misfires and opposed misfires between adjacent cylinders. Crankshaft rotation is sensed and crankshaft velocities are measured for each cylinder. Changes in angular velocity are determined which correspond to each of a plurality of cylinder firing events. A plurality of the changes in angular velocity are sorted over a predetermined series of cylinder firings. Two middle most angular velocity changes are averaged to provide an average change in velocity value. A deviation is determined between the change in angular velocity for a selected cylinder and the average change in velocity value. The deviation is compared to a threshold value and a misfire event is determined for the selected cylinder based on the comparison. According to a preferred embodiment, the threshold value is determined by engine speed and manifold pressure.

BRIEF DESCRIPTION OF THE DRAWINGS

Other objects and advantages of the present invention will become apparent to those skilled in the art upon reading the following detailed description and upon reference to the drawings in which:

FIG. 2 is a pictorial diagram illustrating an engine crankshaft and camshaft for providing measurements for use with the misfire detection apparatus of FIG. 1;

FIG. 4 illustrates a series of changes in angular velocity measurements as selected for a 4-cylinder engine;

FIG. 5 illustrates a series of changes in angular velocity measurements as selected for a 6-cylinder engine;

FIG. 6 is a three-dimensional mapped surface illustrating RPMLOW threshold values; and FIG. 7 illustrates one example the detection of multiple cylinder misfires with the novel misfire detection of the present invention.

DETAILED DESCRIPTION OF THE PREFERRED EMBODIMENTS

Figure 1:
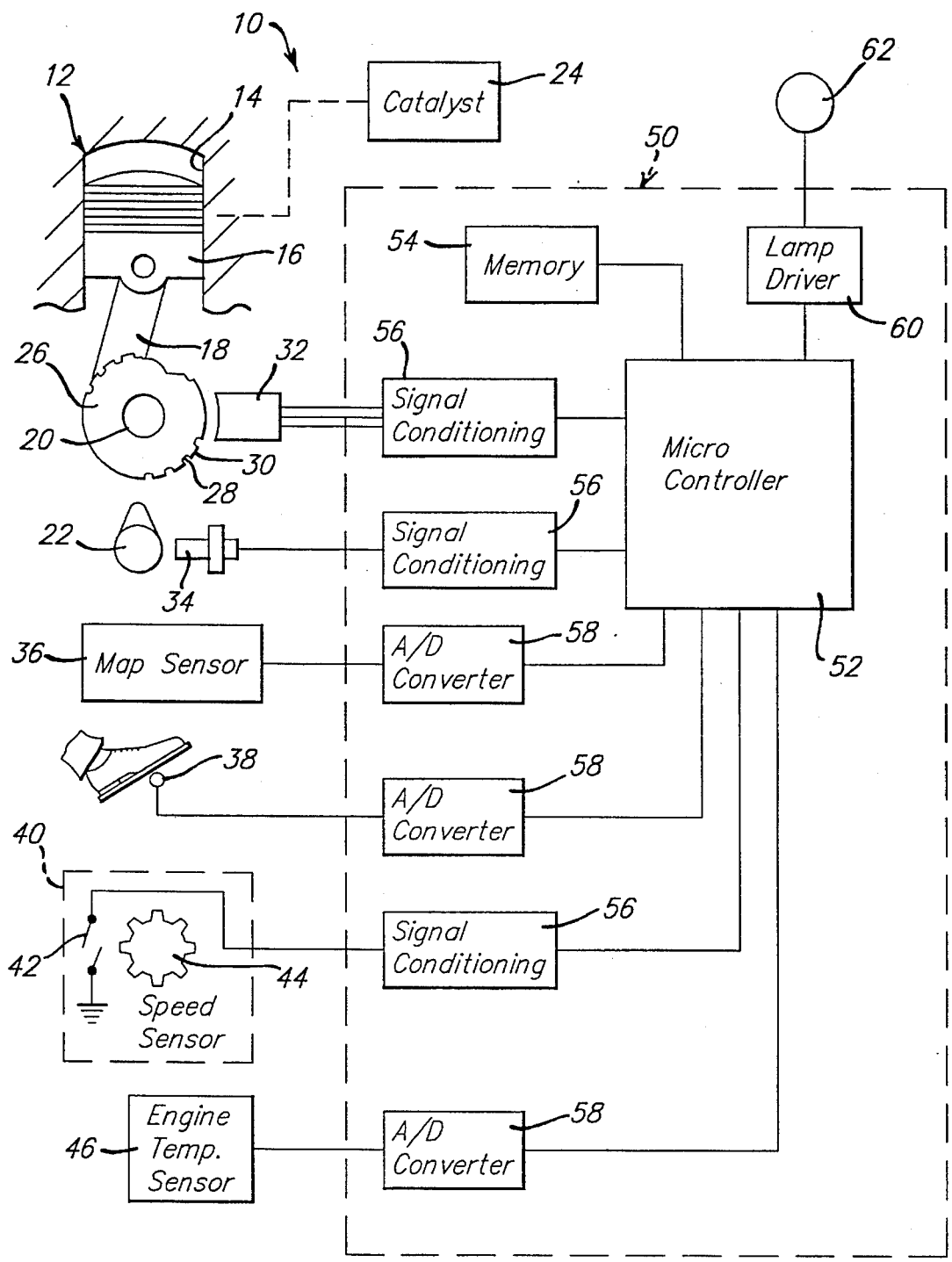
FIG. 1 is an overall block diagram illustrating a misfire detection apparatus according to the present invention.

Turning now to FIG. 1, an overall block diagram illustrating the misfire detection apparatus 10 according to the present invention is shown therein. The misfire detection apparatus 10 is used on an internal combustion engine indicated by reference numeral 12, of a motor vehicle (not shown). A partial cut-away view of engine 12 is shown illustrating one of a multiple of cylinders 14 in the engine 12. As illustrated, a piston 16 is disposed in the cylinder 14 and is operatively connected by a connecting rod 18 to a crankshaft 20. A camshaft 22 is used to open and close at least one valve (not shown) of the cylinder 14 for various strokes of the piston 16. The piston 16 is illustrated in the expansion (power) stroke of a four stroke engine. In such a four stroke engine, the strokes include intake, compression, expansion (power), and exhaust. During the exhaust stroke, exhaust gases flow from the cylinder 14 via at least one valve and through the exhaust system (not shown). Although the preferred embodiment of apparatus 10 shows a four stroke engine, the apparatus 10 can also be applied to other internal combustion engines, such as a two stroke engine. It should also be appreciated that the apparatus 10 can also be applied to any spark-ignited or diesel engine. It should be appreciated that a spark plug is present in the preferred embodiment, although it is not illustrated herein. Additionally, a catalyst 24 of a catalytic converter (not shown) is illustrated pictorially as part of the exhaust system.

The misfire detection apparatus 10 further includes a sensor target 26 operatively connected to the crankshaft 20. The sensor target 26 has at least one, and preferably a plurality of trip points, which in the preferred embodiment are provided as slots 28, formed by teeth 30. The apparatus 10 also includes a crankshaft sensor 32 for communication with the sensor target 26 and a camshaft sensor 34 in communication with the camshaft 22. The misfire detection apparatus 10 further includes a manifold absolute pressure (MAP) sensor 36, throttle sensor 38, a vehicle speed sensor 40 and an engine temperature sensor 46. The outputs of the sensors 36, 38, 40 and 46 communicate with an engine control unit, generally indicated by 50.

The engine control unit 50 includes a microcontroller 52, memory 54, signal conditioning circuitry 56 and analog-to-digital (A/D) converters 58 to process outputs from the various sensors according to the misfire detection methodology to be described hereinafter. In the preferred embodiment, the outputs of crankshaft sensor 32, camshaft sensor 34, and vehicle speed sensor 40 communicate with the microcontroller 52 via appropriate signal conditioning circuitry 56 which is particularized to the type of sensor employed. The output of the MAP sensor 36, throttle position sensor 38 and engine temperature sensor 46 communicate with the microcontroller 52 via the ND converters 58. The engine control unit 50 also includes a lamp driver 60, which takes the output of the microcontroller 52 and drives an output display such as an indicator light or driver warning lamp 62. Memory 54 is a generic memory which may include Random Access Memory (RAM), Read Only Memory (ROM) or other appropriate memory. It should also be appreciated that the engine control unit 50 also includes various timers, counters and like components for the misfire detection methodology of the present invention.

Referring to FIG. 2, a pictorial diagram illustrating the crankshaft 20, camshaft 22, sensor target 26, crankshaft sensor 32 and camshaft sensor 34 in communication with the engine control unit 50 is provided for the misfire detection methodology. According to one embodiment, the sensor target 26 is formed by slots 28 which are cut into a counterweight 63. The counterweight 63 is attached to or incorporated on a pulley or wheel (not shown) such as by welding, although other suitable means may be employed to securely fasten the counterweight 63 to the wheel. The wheel, in turn, is affixed to and driven by the crankshaft 20.

According to one embodiment of a four-cylinder engine, the engine 12 has four cylinders 14 oriented into a straight line configuration, resulting in a one hundred eighty degree (180°) expansion stroke for each cylinder 14. The firing order for the four cylinders 14 is 1 3 4 2. Crankshaft velocity measurements are taken by measuring the amount of time expired over an angular displacement θ for a forty degree (40°) interval of the expansion stroke for each cylinder 14 of the engine 12. Preferably, the forty degree (40°) interval is near the end of the expansion stroke. As illustrated in FIG. 2, a signature slot 64 is cut into the counterweight 63 such that a first edge 65 is a forty-nine degree (49°) edge. At least one slot 28 is cut in the counterweight 63 after the first edge 65 has formed a second edge 68 at a nine degree (9°) edge. Other slots 28 may also be cut in the counterweight 63 between the first and second edges 65 and 66 for use for ignition timing or other purposes. It should be appreciated that the first edge 65 identifies the starting location for pressuring velocity corresponding to cylinder numbers 1 and 4 of the cylinders 14.

The sensor target 26 includes at least two other slots 28 to form a third edge 67 and a fourth edge 68 opposite or one hundred eighty degrees (180°) from the first edge 65 and second edge 66, respectively. Optionally, other slots 28 may also be cut in the flange 63 between the third and fourth edges 67 and 68 for use for ignition timing or other purposes.

It should be appreciated that the third edge 67 identifies the starting location for measuring velocity corresponding to cylinder numbers 3 and 2 of the cylinders 14. It should also be appreciated that the third edge 67 is a forty-nine degree (49°) edge and the fourth edge 68 is a nine degree (9°) edge.

According to another embodiment, a six-cylinder engine has six cylinders in an overlapping configuration resulting in a one hundred twenty degree (120°) expansion stroke for each cylinder 14 of engine 12. For the six-cylinder engine, crankshaft velocity measurements are preferably taken over an angular displacement θ for a sixty degree (60°) interval of the expansion stroke. The sixty degree (60°) interval is measured from a sixty-nine degree (69°) edge and a nine degree (9°) edge. While four-cylinder and six-cylinder engines are described herein, it should be appreciated that the present invention applies to various other size multi-cylinder engines and other various overlapping cylindering configurations.

The crankshaft sensor 32 is used to measure position markings, namely edges 65–68 on sensor target 26, for use in determining crankshaft velocity. The crankshaft sensor 32 mounted near the sensor target 26 and is located so that when aligned with edges 66 and 68 a falling edge will occur at nine degrees (9°) before piston top dead center (TDC). In one embodiment, the crankshaft sensor 32 may be a hall effect sensor. It should also be appreciated that other sensors such as optical sensors or variable reluctance sensors may also be used according to other embodiments.

The camshaft sensor 34 is used to identify specific cylinder firings. Since the camshaft 22 rotates 360° for every 720° of rotation of crankshaft 20, identification of a given cylinder can be determined. Such identification will assist in pinpointing exactly what cylinder or cylinders are misfiring. Although the preferred embodiment uses a stock cam sensor and algorithm to determine top dead center (TDC) of the number 1 cylinder, cylinder identification techniques may vary with different engines. It should also be understood that the camshaft sensor 34 and camshaft 25 are conventional components generally known in the art.

Figure 3:
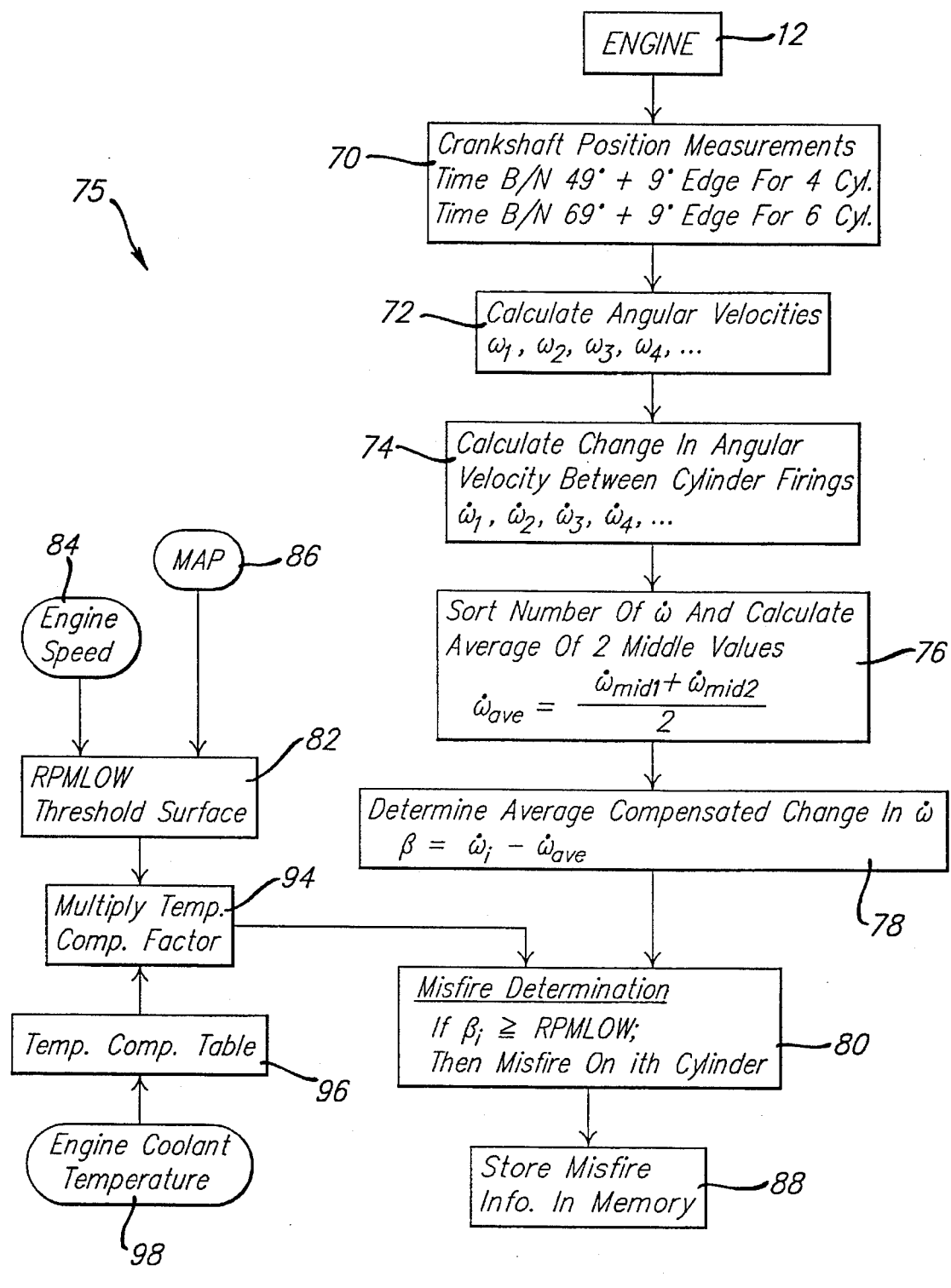
FIG. 3 is a detailed flow chart illustrating the overall methodology for detecting cylinder misfires in a multi-cylinder engine according to the present invention.

Referring to FIG. 3, a flow chart illustrating the overall method 75 for detecting cylinder misfires of engine 12 is shown therein according to the present invention. The misfire detection methodology 75 generally begins at block 70. During operation of engine 12, crankshaft position measurements are taken over a predefined angular displacement θ of the crankshaft 20 during an expected cylinder firing for each cylinder 14 of engine 12. The position measurements are preferably obtained by measuring a time interval (T) expired during rotation of the crankshaft 20 through the predefined angular displacement θ. This is accomplished by microcontroller 52 starting a timer when crankshaft sensor 32 detects first edge 65 for a four-cylinder engine. For the four-cylinder engine application, the timer is stopped after a forty degree (40°) rotation when sensor 32 detects second edge 66. For the next cylinder firing, a timer is likewise started when crankshaft sensor 32 detects the third edge 67 and is stopped after a forty degree (40°) rotation when sensor 32 detects the fourth edge 68. For a six-cylinder engine application, the preferred timer measurements are taken over a sixty degree (60°) angular rotation interval.

The methodology 75 advances to step 72 wherein the individual time intervals (T) measured by the microcontroller 52 are used by the microcontroller 52 to calculate an angular velocity (RPM) value ω of the crankshaft for the corresponding cylinder. This is generally accomplished by dividing the angular displacement θ by the corresponding time measurement (T). The position time measurements and angular velocity calculations are continually repeated for each cylinder firing event to obtain a series of angular velocities $\omega_1, \omega_2, \omega_3, \omega_4, \omega_5, \omega_6 \ldots$, etc. corresponding to respective cylinders 1, 3, 4, 2, 1, 3 . . . , for example.

The misfire detection methodology 75 proceeds to step 74 in which microcontroller 52 calculates changes in angular velocity (ω) which correspond to each expected cylinder firing event. The change in angular velocity for a current cylinder (i) is calculated by determining the difference between angular velocity for the current cylinder (i) and the following successive cylinder (i+1). According to one embodiment described herein, the following velocity is subtracted from the current velocity so that velocity changes for a misfire yield positive values. Likewise, the current velocity can be subtracted from the following velocity. The calculated changes in angular velocity are represented by $\omega_1, \omega_2, \omega_3, \omega_4$, etc. The angular velocity changes ω are continually calculated from one cylinder firing event to another and may be accumulated and a consecutive series of angular velocity changes may be saved in memory 54 or calculated from stored velocity information ω.

With particular reference to FIGS. 4 and 5, a continuous series of consecutive changes in angular velocity ω are shown for a four-cylinder engine provided in FIG. 4 and a six-cylinder engine provided in FIG. 5. Referring to the four-cylinder engine of FIG. 4, a continuous series of consecutive changes in angular velocity $\omega_{i-3}, \omega_{i-2}, \omega_{i-1}, \omega_i, \omega_{i+1}, \omega_{i+2}, \omega_{i+3}, \omega_{i+4}, \omega_{i+5}$ are shown for respective cylinder firing events corresponding to cylinders 4 2 1 3 4 2 1 3 4. According to the present invention, a window containing a series 90 of consecutive angular velocity changes is selected. The selected series 90 includes the current change in angular velocity $\omega_i$ for the current cylinder firing event (i) and adjacent changes in angular velocity. According to one embodiment, the misfire detection methodology 75 preferably selects a series 90 of X=4 angular velocity changes which includes the angular velocity changes for the current cylinder $\omega_i$, the single previous cylinder firing event $\omega_{i-1}$ and the two successive following cylinder firing events $\omega_{i+1}$ and $\omega_{i+2}$. According to an alternate embodiment, a series 90' of selected changes in angular velocity correspond to the two previous cylinder firing events $\omega_{i-2}$ and $\omega_{i-1}$, the current cylinder firing event $\omega_i$ and the following cylinder firing event $\omega_{i+1}$.

According to the six-cylinder arrangement as shown in FIG. 5, a window containing a series 92 of six consecutive angular velocity changes is similarly selected from a continuous series of calculated angular velocity changes. According to one preferred embodiment, the series 92 includes the current change in angular velocity $\omega_i$ for cylinder firing event (i), the three previous consecutive cylinder firing events $\omega_{i-3}, \omega_{i-2}$, and $\omega_{i-1}$, and the following two cylinder firing events $\omega_{i+1}$ and $\omega_{i+2}$. According to an alternate embodiment for the six-cylinder arrangement, the selected series 92' includes the previous two cylinder firings as shown by $\omega_{i-2}$, and $\omega_{i-1}$, the current cylinder firing event $\omega_i$ and the following three cylinder firing events $\omega_{i+1}, \omega_{i+2}$ and $\omega_{i+3}$.

Accordingly, a series 90 or 90' of four changes in angular velocity corresponding to four consecutive cylinder firing events are selected for a four-cylinder engine, while a series 92 or 92' of six velocity changes corresponding to six cylinder firing events are measured for a six-cylinder engine. In either case, the window containing the series of selected angular velocity changes includes velocity changes corresponding to the current cylinder of interest and adjacent cylinders. It is preferred that the series has an even number of selected angular velocity changes. It is also preferred that the number of selected velocity changes be equal to the number of cylinders in the engine of interest.

Referring back to FIG. 3, the selected changes in angular velocity are sorted by amplitude as provided in step 76 of the misfire detection methodology 75. Of the sorted changes in angular velocity, the middle two values $\omega_{mid1}$ and $\omega_{mid2}$ are chosen and are used to calculate an average change in angular velocity $\omega_{AVE}$. This is accomplished by dividing in half the sum of middle values $\omega_{mid1}$ and $\omega_{mid2}$. The average change in angular velocity $\omega_{AVE}$ is continually calculated for each cylinder firing event.

Next, an average compensated change in the angular velocity change is determined as shown in step 78. This is accomplished by comparing the current change in angular velocity $\omega_i$ with the average angular velocity change $\omega_{AVE}$ to determine the average compensated change in the angular velocity change as represented by $\beta$. Preferably, $\beta$ is determined by subtracting the average angular velocity change $\omega_{AVE}$ from the current angular velocity change $\omega_i$.

The average compensated change in angular velocity change $\beta$ is used to determine misfire on the current cylinder as provided by step 80 of the methodology 75. More particularly, the average compensated change in angular velocity change $\beta$ is compared with a predetermined threshold value (RPMLOW) to determine if a misfire has been detected. The predetermined threshold value RPMLOW is retrieved from a threshold surface 82 of information stored in memory or a state machine. Threshold value RPMLOW is a function of engine speed, change in engine speed and manifold pressure (MAP) and can be retrieved from a mapped surface. Referring momentarily to FIG. 6, an example of a threshold surface 82 is provided therein. The RPMLOW threshold value as provided by value 100 is determined by looking up the engine speed and manifold pressure as presented during the misfire determination for the current cylinder firing event. Accordingly, engine speed 84 is monitored as well as manifold pressure (MAP) 86, while microcontroller 52 determines changes in engine speed.

Additionally, the selected RPMLOW threshold value may optionally be multiplied by a temperature compensation factor 94 in order to compensate for a cold engine condition. In doing so, current engine temperature 98 is measured and a temperature compensation factor is looked up in a compensation table 96. This compensation table factor is then multiplied by the selected RPMLOW threshold value and used as the comparison threshold value RPMLOW for misfire determination in step 80.

When a misfire event is detected, the cylinder 14 is identified by the camshaft sensor 34 and the crankshaft sensor 32 and the cylinder misfire information is stored in memory according to step 88. The accumulated misfire information may be retrieved and used to determine the cause of an engine problem. Additionally, the number of misfires may be evaluated by the microcontroller 52 to determine whether a given rate of misfire would cause premature failure of the catalyst 24. If catalyst failure is indicated, the cylinder number or identification may be recorded by microcontroller 52 and the driver warning lamp 62 can be illuminated by the lamp driver 60. Nonetheless, the driver warning lamp 62 can be illuminated to indicate one or more misfire events.

The misfire detection apparatus and methodology of the present invention advantageously is operable to detect misfires occurring on multiple cylinders and successive cylinder misfire events. An example of multiple cylinder misfire detection achieved with the present invention is provided in FIG. 7. In the example of FIG. 7, cylinder 1, which shares the same coil as cylinder 4 of a distributorless ignition system, is disconnected. This results in a common mode failure where both cylinders 1 and 4 exhibit misfire. Despite the disconnection of cylinder 1, the misfire detection of the present invention is able to detect the occurrence of misfires on both cylinders 1 and 4 as provided by the negative average compensated change in angular velocity change $\beta$ shown by reference numerals 102 which exceeds the threshold value RPMLOW 100.

While a specific embodiment of the invention has been shown and described in detail to illustrate the principles of the present invention, it will be understood that the invention may be embodied otherwise without departing from such principles. For example, one skilled in the art will readily recognize from such discussion and from the accompanying drawings and changes that various changes, modifications and variations can be made therein without departing from the spirit and scope of the present invention as described in the following claims.

What is claimed is:

1. An apparatus for detecting misfire in individual cylinders of an internal combustion engine in a motor vehicle, comprising:

means for sensing rotation of a crankshaft;

measuring means connected to the sensing means for measuring changes in angular velocity corresponding to each of a plurality of expected cylinder firings;

means for sorting an even number of angular velocity changes by amplitude for a predetermined series of expected cylinder firings;

averaging means for averaging two middle most of the angular velocity changes from said sorted plurality of angular velocity changes so as to provide an average change in velocity value;

deviation means coupled to said averaging means and measuring means for determining a deviation between a change in angular velocity for a selected cylinder firing and the average change in velocity value; and means for comparing the deviation with a threshold value to detect the occurrence of a misfire for the selected cylinder as a result of said comparison.

2. The apparatus as defined in claim 1 wherein said threshold value comprises a value dependent on engine speed and manifold pressure.

3. The apparatus as defined in claim 2 wherein said threshold value is stored in a look-up table.

4. The apparatus as defined in claim 1 wherein said even number of cylinder firings is equal to the number of cylinders in the engine.

5. The apparatus as defined in claim 1 wherein said even number of cylinder firings includes the selected cylinder, at least one cylinder firing before the selected cylinder and at least one cylinder firing after the selected cylinder firing.

6. A method of detecting misfires in individual cylinders of an internal combustion engine in a motor vehicle and which is capable of detecting opposed cylinder misfires, said method comprising:

sensing rotation of a crankshaft;

measuring changes in crankshaft velocity;

selecting one of the cylinder firings for detection;

sorting an even number of velocity changes measured for expected cylinder firing events occurring near the selected cylinder, wherein said even number of velocity changes is equal to X multiplied by the number of cylinders of the engine, and X is a whole number;

selecting two middle most values from the sorted even number of velocity changes;

averaging the two middle most values to provide an average change in velocity value;

determining a deviation of change of velocity of the selected cylinder firing from the average change in velocity value;

comparing the deviation with a threshold value; and detecting a misfire of the selected cylinder firing depending on the result of the comparing step.

7. A method of detecting misfires in individual cylinders of an internal combustion engine in a motor vehicle, said method comprising:

sensing rotation of a crankshaft;

measuring changes in crankshaft velocity;

selecting one of the cylinder firings for detection;

sorting a predetermined even number of velocity changes measured for cylinder events occurring near the selected cylinder;

selecting two middle values from said sorted predetermined even number of velocity changes;

averaging the two middle values to provide an average change in velocity value;

determining a deviation of change of velocity of the selected cylinder firing from the average change in velocity value;

comparing the deviation with a predetermined threshold; and detecting a misfire of the selected cylinder firing depending on the result of the comparing step.

8. The method as defined in claim 7 further comprising the steps of measuring engine speed and manifold pressure and determining the threshold value as a function of the engine speed and manifold pressure.

* * * * *